US008243198B2

(12) United States Patent
Lee et al.

(10) Patent No.: US 8,243,198 B2
(45) Date of Patent: Aug. 14, 2012

(54) APPARATUS FOR PROVIDING MULTIPLE SCREENS AND METHOD OF DYNAMICALLY CONFIGURING MULTIPLE SCREENS

(75) Inventors: Jong-ho Lee, Seoul (KR); Kwang-kee Lee, Seoul (KR); Un-gyo Jung, Hwaseong-si (KR); Glenn A. Adams, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1204 days.

(21) Appl. No.: 11/496,403

(22) Filed: Aug. 1, 2006

(65) Prior Publication Data

US 2007/0030389 A1    Feb. 8, 2007

Related U.S. Application Data

(60) Provisional application No. 60/705,491, filed on Aug. 5, 2005, provisional application No. 60/789,577, filed on Apr. 6, 2006, provisional application No. 60/812,090, filed on Jun. 9, 2006.

(51) Int. Cl.
*H04N 5/445* (2006.01)
(52) U.S. Cl. ...................................................... 348/588
(58) Field of Classification Search .................. 348/588, 348/563–567, 569, 570, 561; 715/796, 806, 715/781; 345/641, 1.1, 1.3
See application file for complete search history.

(56) References Cited

U.S. PATENT DOCUMENTS

| 5,289,574 | A | * | 2/1994 | Sawyer | 715/759 |
| 5,347,624 | A | * | 9/1994 | Takanashi et al. | 345/641 |
| 5,430,838 | A | * | 7/1995 | Kuno et al. | 715/806 |
| 5,577,188 | A | * | 11/1996 | Zhu | 715/745 |
| 5,680,177 | A | | 10/1997 | Abe | |
| 5,742,285 | A | * | 4/1998 | Ueda | 715/778 |
| 5,901,366 | A | * | 5/1999 | Nakano et al. | 455/550.1 |
| 6,094,230 | A | | 7/2000 | Han | |
| 6,147,717 | A | | 11/2000 | Jun | |
| 6,369,855 | B1 | * | 4/2002 | Chauvel et al. | 348/423.1 |
| 6,384,868 | B1 | * | 5/2002 | Oguma | 348/564 |
| 6,473,088 | B1 | * | 10/2002 | Matsumoto et al. | 345/530 |
| 6,917,362 | B2 | * | 7/2005 | Pinedo et al. | 345/530 |
| 7,213,213 | B2 | * | 5/2007 | Sekiguchi | 715/781 |

(Continued)

FOREIGN PATENT DOCUMENTS

CN    1550979 A    12/2004

(Continued)

OTHER PUBLICATIONS

Morris, S., et al., "Interactive TV Standards: A Guide to MHP, OCAP, and Java TV", 2005, pp. 89-98, 118-178, ch. 5, 7, Focal Press, Elsevier.

*Primary Examiner* — Paulos Natnael
(74) *Attorney, Agent, or Firm* — Sughrue Mion, PLLC

(57) ABSTRACT

An apparatus for providing multiple screens and a method of dynamically configuring the multiple screens are provided. The apparatus for providing multiple screens uses flags included transferred packets in order to dynamically configure multiple screens that provide a plurality of contents on a physical display device and a method of dynamically configuring multiple screens. The apparatus for providing multiple screens includes a digital signal processing module which determines whether an application included in data information can be executed on a screen on the basis of received data information, and an operational module which operates the application on the screen on the basis of the determination result.

4 Claims, 9 Drawing Sheets

U.S. PATENT DOCUMENTS

| | | |
|---|---|---|
| 7,391,473 B2 * | 6/2008 | Takahashi ..................... 348/561 |
| 2002/0073411 A1 * | 6/2002 | Tsunedomi et al. .......... 717/171 |
| 2003/0142037 A1 | 7/2003 | Pinedo et al. |
| 2004/0095401 A1 * | 5/2004 | Tomimori ..................... 345/864 |
| 2005/0148979 A1 * | 7/2005 | Palma et al. ............. 604/385.02 |
| 2005/0149879 A1 * | 7/2005 | Jobs et al. .................... 715/796 |

FOREIGN PATENT DOCUMENTS

| | | |
|---|---|---|
| EP | 1 555 649 A2 | 7/2005 |
| JP | 62-251926 A | 11/1987 |

* cited by examiner

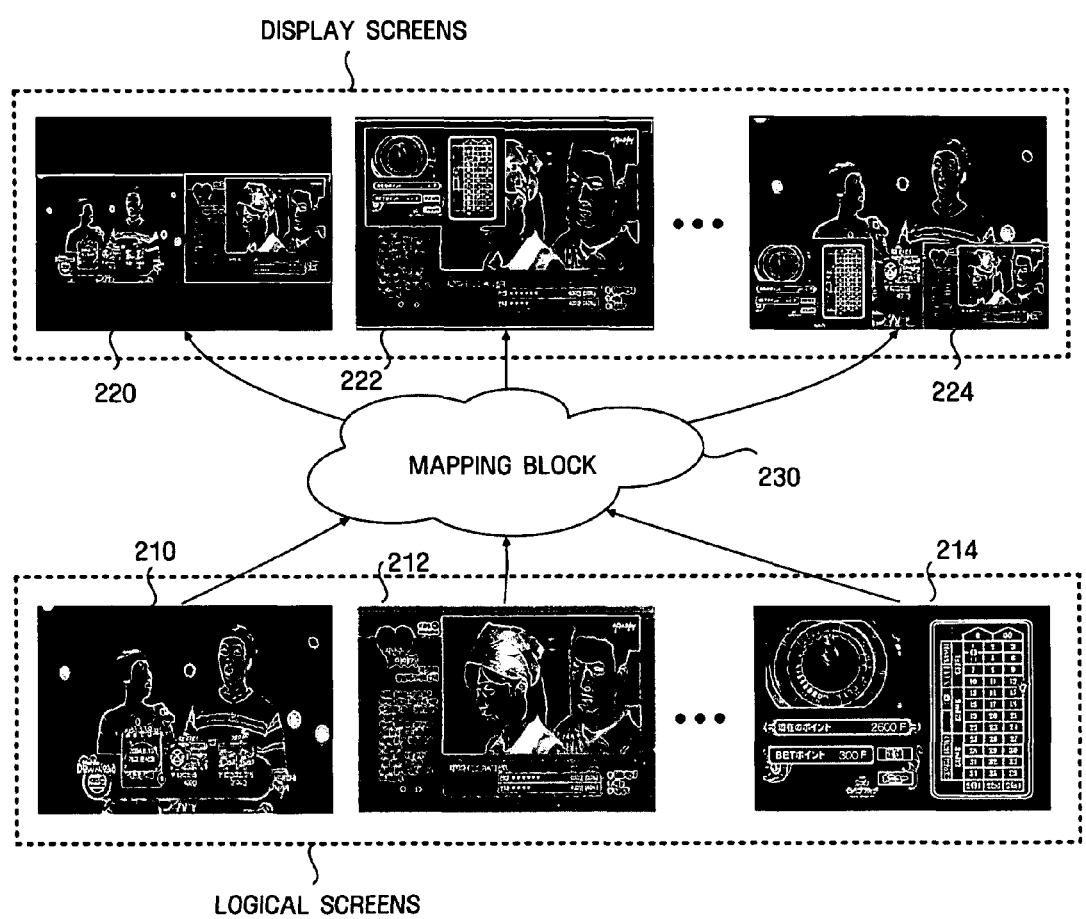

ABSTRACT SERVICE

NON-ABSTRACT SERVICE

APPARATUS FOR PROVIDING MULTIPLE SCREENS AND METHOD OF DYNAMICALLY CONFIGURING MULTIPLE SCREENS

CROSS-REFERENCES TO RELATED APPLICATIONS

This application claims priority from U.S. Provisional Patent Application Nos. 60/705,491, 60/789,577 and 60/812,090 filed on Aug. 5, 2005, Apr. 6, 2006 and Jun. 9, 2006, respectively, in the United States Patent and Trademark Office, the disclosures of which are incorporated herein by reference in its entirety.

BACKGROUND OF THE INVENTION

1. Field of the Invention

Apparatuses and methods consistent with the present invention relate to dynamically configuring the multiple screens and, more particularly, to providing multiple screens that uses flags included transferred packets in order to dynamically configure multiple screens that provide a plurality of contents on a physical display device and a method of dynamically configuring multiple screens.

2. Description of the Related Art

Related art broadcast receivers such as digital televisions (TVs) or digital set-top boxes provide only one content element on a single physical display device or simultaneously display a main screen and a sub-screen on a single physical display device.

Even though related art broadcast receivers can simultaneously display both the main screen and the sub-screen on the same display screen, they can only arrange the main screen and the sub-screen in a limited number of manners. In the case of a content displayed within the main screen, all elements of the content, i.e., video data, audio data, and other data, are displayed. On the other hand, in the case of a content displayed within the sub-screen, only some of the elements of the content are displayed.

Content sources include a broadcast service such as a satellite broadcaster, a terrestrial broadcaster, or a cable broadcaster, a storage medium such as digital versatile discs (DVDs), or an external device connected to an input terminal. However, it is quite difficult to display contents provided by such various content sources on a display screen using the existing broadcast receivers.

In an interactive TV application program environment such as the Multimedia Home Platform (MHP), the Advanced Common Application (ACAP), and the Open Cable Application Platform (OCAP), it is assumed that only one screen is output on a physical display device.

In the interactive TV application program environment, for example, a Home Audio/Video Interoperability (HAVi)-based user interface (UI) is adopted. According to the HAVi UI standard, even though no restriction is imposed on the number of screens displayed on a physical display device, only one screen is generally displayed on a physical display device.

In such an environment, it is difficult to perform operations, such as decoding, digital signal processing, user interaction processing, etc. with respect to one among multimedia contents displayed on a screen while displaying the multimedia contents on independent screens. In addition, it is also difficult to dynamically control the life cycles of application programs and the use of resources in the units of the screens.

Accordingly, there exists a need for a method of displaying a variety of contents on a dynamically configured screen.

SUMMARY OF THE INVENTION

The present invention provides an apparatus for providing multiple screens and a method of dynamically configuring the multiple screens, wherein packets including information for dynamically configuring multiple screens which provide a plurality of contents on a physical display device.

According to an aspect of the present invention, there is provided an apparatus for providing multiple screens. The apparatus includes a digital signal processing module which determines whether an application included in data information can be executed on a screen on the basis of received data information, and an operational module which operates the application on the screen on the basis of the determination result.

According to a further aspect of the present invention, there is provided a method of dynamically configuring multiple screens. The method includes determining whether an application included in data information can be executed on a screen on the basis of the received data information, and operating the application on the screen on the basis of the determination result.

BRIEF DESCRIPTION OF THE DRAWINGS

The above and other aspects of the present invention will become more apparent by describing in detail exemplary embodiments thereof with reference to the attached drawings in which:

FIG. 2 is a diagram illustrating the relationship between a logical screen and a display screen according to an exemplary embodiment of the present invention;

DETAILED DESCRIPTION OF EXEMPLARY EMBODIMENTS OF THE INVENTION

Figure 1A:
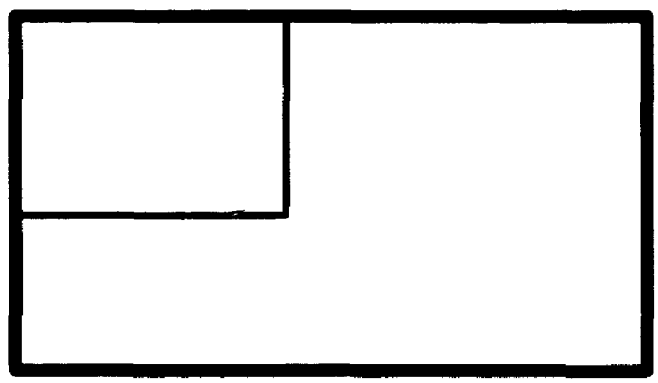
FIG. 1A to 1H are diagrams illustrating configurations of a PiP screen according to exemplary embodiment of the present invention.
Figure 1B:
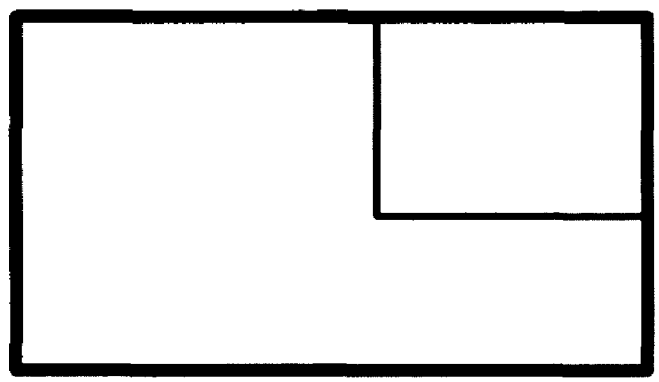
Figure 1C:
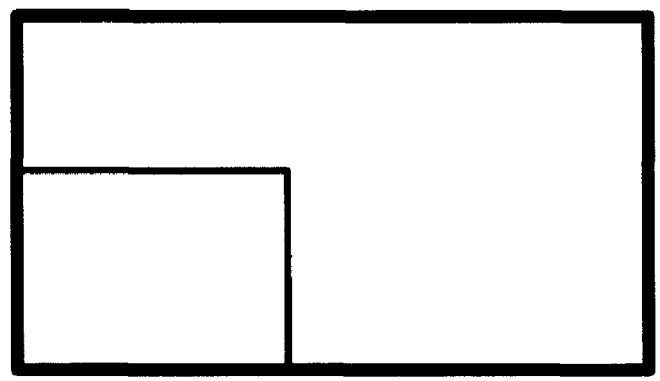
Figure 1D:
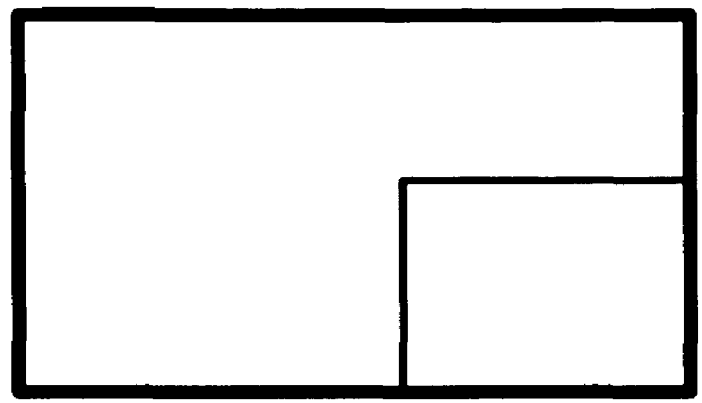

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks illustrated in succession may in fact be executed substantially concurrently or the blocks may sometimes be executed in the reverse order, depending upon the functionality involved.

For a better understanding of the present invention, the terms used in this disclosure will now be defined.

The term 'service' indicates a group of multimedia contents displayed together, i.e., a group of service components.

Service components are elements of a service and include a video component, an audio component, and a data component. A data component is an application program in a service.

The term 'service context' indicates an object which can control the executing of a service and includes various resources information, device information, and execution state information needed for providing a service.

The term 'physical display device' indicates a physical space which actually displays the content of a service.

The term 'display screen' indicates a screen actually displayed on a physical display device. An arbitrary service may be directly set in the display screen, and the display screen may be displayed on a physical display device. Alternatively, at least one logical screen which is mapped to a certain area of the display screen may be displayed on the physical display device.

The term 'logical screen' indicates a space in which an arbitrary service is displayed. A logical screen is a virtual screen before being mapped to a display screen and thus is not displayed on a physical display device.

The logical screen and the display screen may be a combination of a background still image, a video raster, and a graphic raster. The graphic raster may be a combination of text, lines, colors, and images or a mixture of video frames.

The term 'main service' indicates a service that is selected as a main service through a menu displayed on the physical display device or a remote controller by a user or through an API by an application, and the screen on which the main service is displayed is referred to as a 'main screen'.

The term 'Picture-in-Picture service' (PiP service) indicates a service that is selected as a sub-service in the main service through a menu displayed on a physical display device or a remote controller by a user or via an API by an application, and the PiP service may be displayed on a picture-in-picture screen (PiP screen) or a main screen.

Figure 1E:
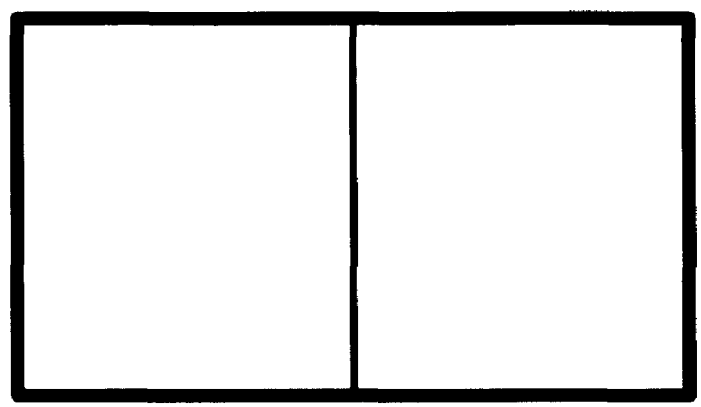
Figure 1F:
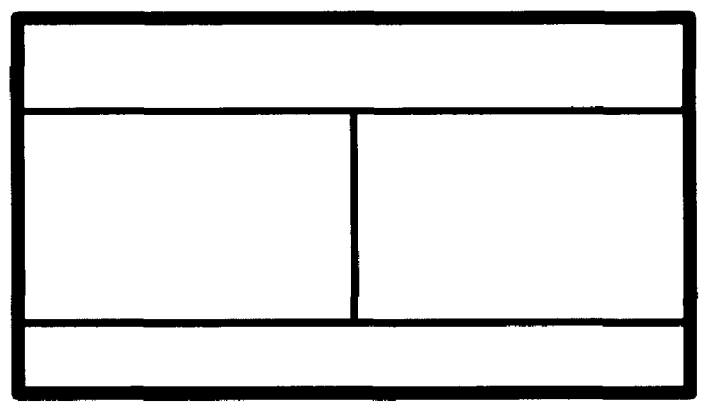
Figure 1G:
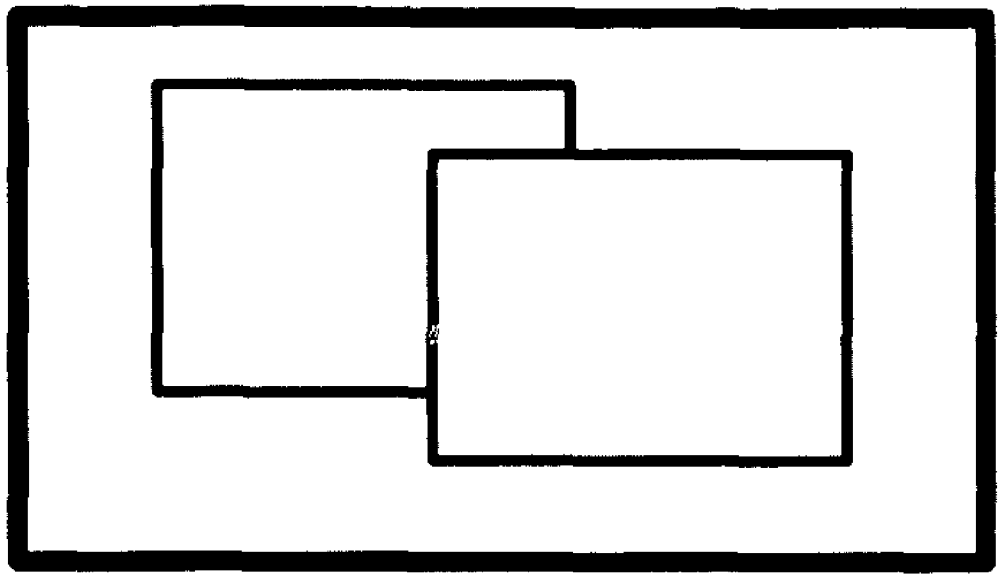
Figure 1H:
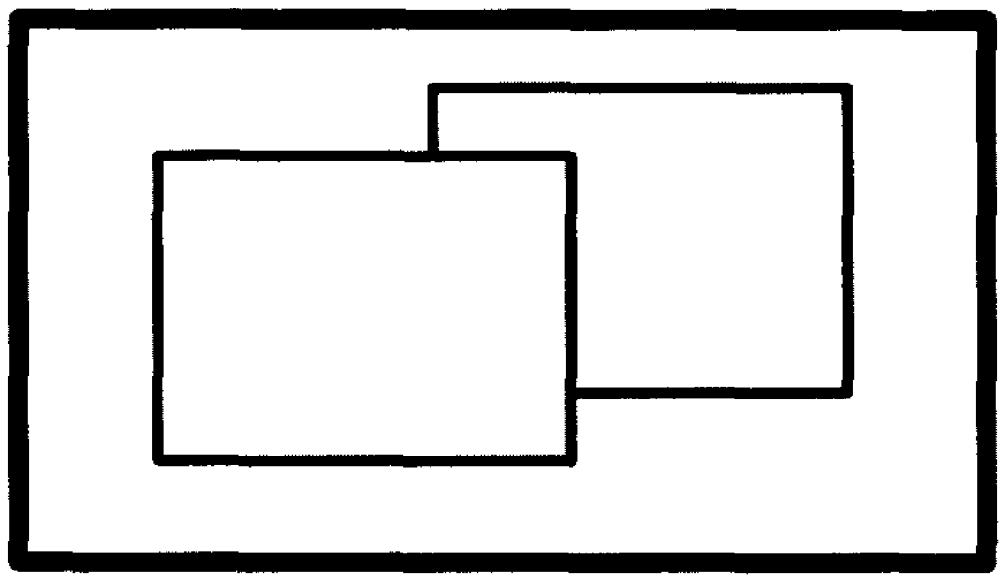

The PiP screen includes a screen that occupies a part of another screen as illustrated in FIGS. 1A to 1D and a screen that is simultaneously displayed with another screen without overlapping the other screen as illustrated in FIGS. 1E to 1F. In this case, it is understood that the PiP screen may include a screen that overlaps another screen on an arbitrary location or area in the physical display device, as illustrated in FIGS. 1G and 1H.

FIG. 2 is a diagram illustrating the relationship between a logical screen and a display screen according to an exemplary embodiment of the present invention.

Referring to FIG. 2, a service may be displayed using logical screens 210, 212, and 214. The logical screens 210, 212, and 214 are mapped to display screens 220, 222, and 224 through a mapping block 230.

In detail, the logical screens 210 and 212 are mapped to the display screen 220, the logical screens 212 and 214 are mapped to the display screen 222, and the logical screens 210, 212, and 214 are mapped to the display screen 224.

In short, at least one logical screen which displays a service is mapped to an arbitrary area of a display screen by the mapping block 230.

The mapping block 230 is a group of various pieces of information needed for mapping a logical screen to a display screen. Examples of the various pieces of information include coordinate information of a predetermined area on a display screen to which each of a plurality of logical screens is mapped, identification information of the logical screens and the display screen, and information specifying in what order the logical screens are displayed on the display screen.

The mapping block 230 may be realized by interfaces or functions prepared by various computer program languages to be executed and create or change the relationship between the logical screen and the display screen by using the above information as parameters.

Also, the mapping block 230 may be realized by a hardware which has a mapping function between a logical screen and a display screen.

Figure 3:
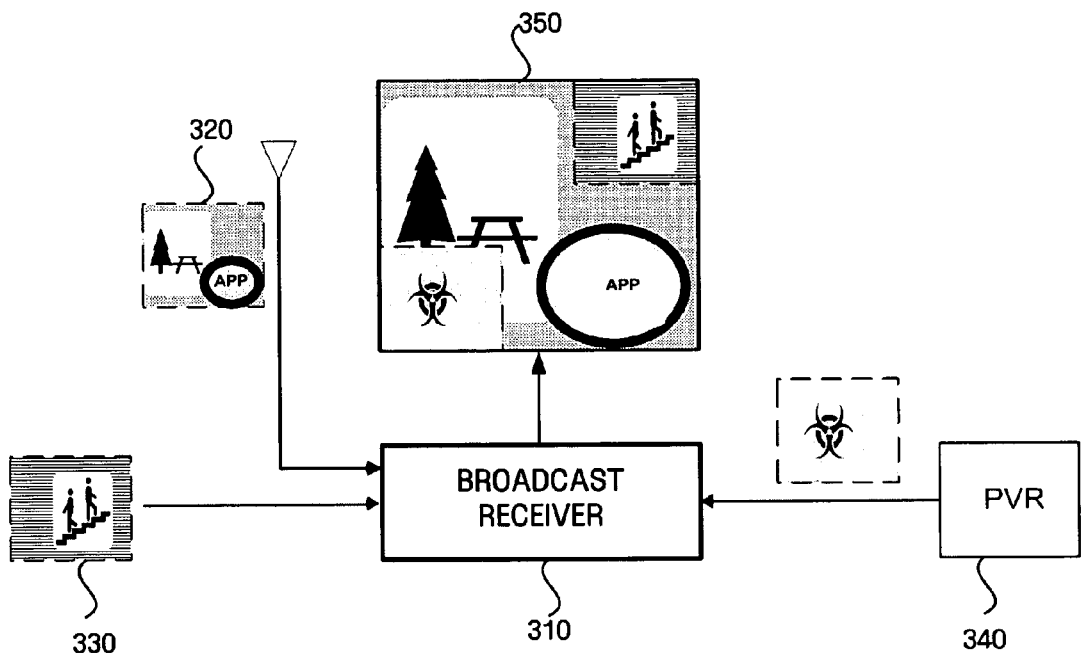
FIG. 3 is a block diagram illustrating service sources according to an exemplary embodiment of the present invention.

Further, services provided by various service sources may be displayed on a display screen, and the display screen may be displayed on a physical display device, as illustrated in FIG. 3.

There are service sources which provide broadcast services such as a terrestrial broadcaster 320 and a cable broadcaster 330, service sources which provide services stored in a storage medium such as a personal video recorder (PVR) 340, and service sources (not illustrated in FIG. 3) which provide services via a wired network or a wireless network.

A broadcast receiver 310 receives services from the service sources and produces logical screens displaying each of the received services.

Then, an arbitrary service is directly set on the display screen to be displayed on a physical display device using a predefined method or a method set by a user or an application. Otherwise, at least one logical screen that is mapped to an arbitrary area on the display screen is displayed on a physical display device 350. In short, services provided by the terrestrial broadcaster 320, the cable broadcaster 330, and the PVR are displayed on the physical display device 350.

The terrestrial broadcaster 320, the cable broadcaster 330, and the PVR 340 are illustrated in FIG. 3 as being service sources, but the present invention is not limited to it. Any type of multimedia content source which provides multimedia contents that can be displayed together can be a service source according to an exemplary embodiment of the present invention.

Figure 4A:
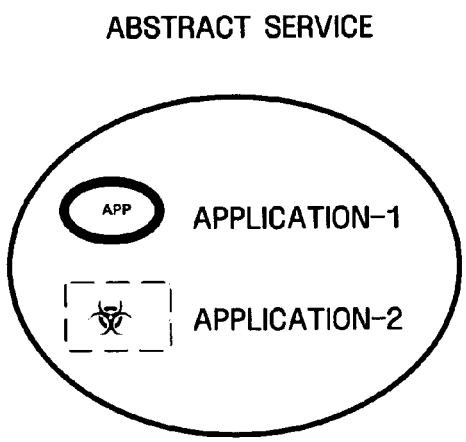
FIGS. 4A and 4B are diagrams illustrating a non-abstract service and an abstract service according to an exemplary embodiment of the present invention.
Figure 4B:
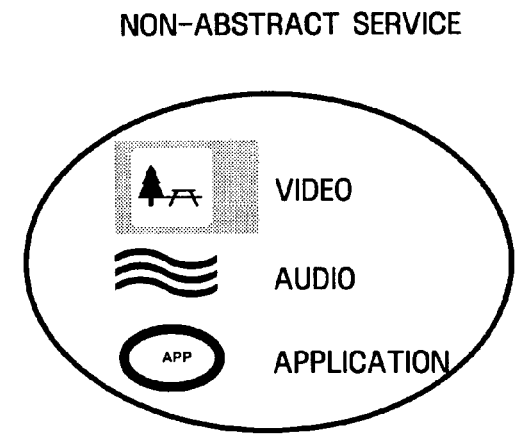

Services according to an exemplary embodiment of the present invention can be classified into abstract services and non-abstract services, as illustrated in FIGS. 4A and 4B.

The abstract services are not services provided by broadcast signals transmitted in real time but services independent of broadcast channels. The abstract services include only data components, i.e., application programs, without video components and audio components. Examples of the abstract services include services having unbound applications based on the standard.

The non-abstract services are understood as services other than abstract services.

According to the current exemplary embodiment of the present invention, both abstract services and non-abstract services have independency. For example, abstract services may be directly set on the physical display device not through logical screens and non-abstract services may be displayed on the logical screens. Then, the logical screens may be mapped to the display screen in which the abstract services are set. Thereafter, the display screen may be output through the physical display device. By doing so, the abstract services can be displayed on the display screen independently of the non-abstract services. In addition, the abstract services and non-abstract services may be mapped to different logical screens. Thereafter, the logical screens may be mapped to a single display screen. In other words, the abstract services can be displayed on the display screen independently of non-abstract services.

According to the current exemplary embodiment of the present invention, the logical screen and the display screen may be categorized as being different objects. Alternatively, a screen may serve as a logical screen or a display screen according to attribute information of one screen object.

In detail, whether a screen object is a logical screen or a display screen depends on the 'type' information among screen object attributes.

Further, the applications include an unbound application and a service bound application. Since the unbound application has a high priority, the resource is smoothly allocated. A monitor application corresponds to a specific unbound application that has the highest priority.

The service bound application is associated to a transport stream, and allows a lower priority than that of the unbound application. The service bound application does not function as a critical system. When a competition for resources occurs, the service bound application has a larger possibility of abandoning the resource allocation than the unbound application.

Application that is driven in an OCAP based terminal or a set-top box may include an electronic program guide (EPG), a video on demand (VOD), an application XYZ, a native application, and the like.

Figure 5:
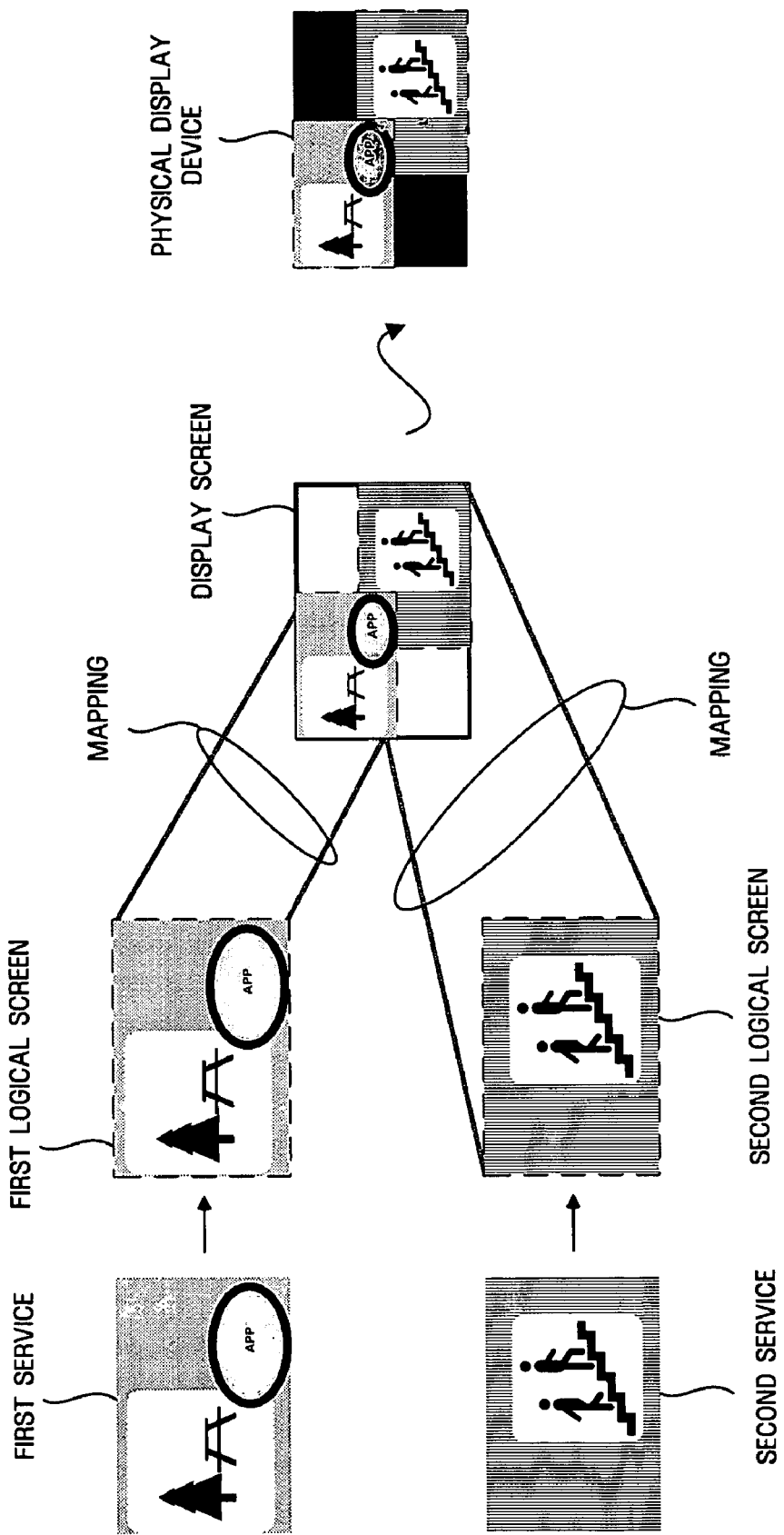
FIG. 5 is a diagram illustrating a method of mapping two services to a display screen according to an exemplary embodiment of the present invention.

FIG. 5 is a diagram illustrating a process that two services are set on two logical screens to be mapped to a single display screen.

Referring to FIG. 5, a first service includes all the three service components, i.e., video, audio, and data components, and a second service includes only video and audio components. However, the present invention does not impose any restrictions on service components, and the first and second services illustrated in FIG. 5 are exemplary.

As illustrated in FIG. 5, the first and second services are displayed on a physical display device in almost the same manner as in the related art. According to the current exemplary embodiment of the present invention, it is possible to display a plurality of services on a physical display device independently of one another without imposing any restrictions on the number of services that can be displayed on a single display screen.

On the other hand, a data component includes application information regarding the application for the service, and the application information includes signal information indicating whether the application can be executed on the PiP screen. Examples of the application information include an application information table (AIT) based on the MHP standard and an eXtended application information table (XAIT) based on the OCAP standard. The signal information may be added to the application information.

According to the Digital Video Broadcasting (DVB) MHP standard, an application is subordinated to a service, and the lifecycle of the application is determined on the basis of a currently selected service. On the other hand, an application according to the OCAP standard is not subordinated to a service, and the lifecycle is further independent of the signal information.

Examples of the application include an application by host device manufacturer, an application that is signaled through an XAIT, and an application registered through a monitor application.

The OCAP terminal can manage the lifecycle of the bound or unbound application by receiving the signal. Various types of signaling for executing the service bound and unbound applications are supported on the basis of the OCAP standard. Contents of an application database are created or renewed as a result of the signaling. The application database is a collective name of data that is managed by an application manager, and the application manager manages the lifecycle of the application using an application lifecycle API.

There are three types of application signaling, wherein one type is for service bound application and the other two types are for unbound application.

As described above, the signaling can be used to notify to the OCAP terminal whether the multiple screens are supported. In detail, a broadcaster provides an application to the OCAP terminal and notifies whether the currently provided application supports the multiple screens, by means of a signal. Therefore, the OCPA terminal can determine whether the currently provided application can be utilized, using the received signal. For example, it is possible to provide functions such as a screen size, screen position, pause, etc. to a user while providing the application on the logical screen.

Figure 6:
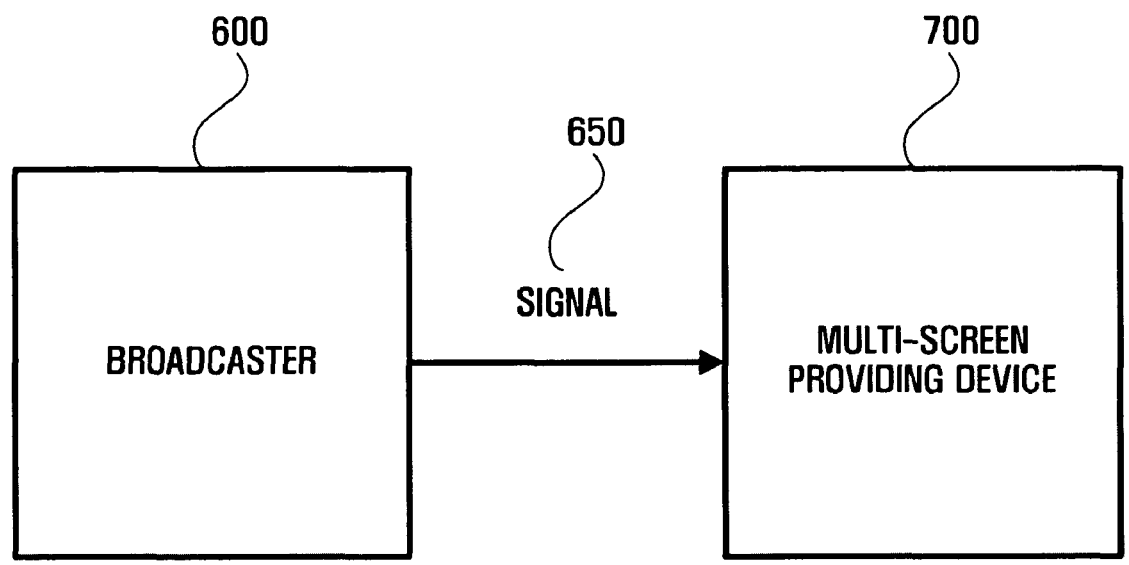
FIG. 6 is a diagram illustrating a configuration of a system for providing multiple screens according to an exemplary embodiment of the present invention.

FIG. 6 is a diagram illustrating a configuration of a system providing multiple screens according to an exemplary embodiment of this invention. Referring to FIG. 6, a broadcaster 600 sends a signal to an OCPA terminal 700 (hereinafter, referred to as a multi-screen providing device).

The broadcaster 600 sends a signal 650 including a flag indicating whether the multiple screens are supported while sending an application to the multi-screen providing device 700. Therefore, the multi-screen providing device 700 allocates an additional logical screen for the supplied application and provides the functions such as a size, a position of the logical screen, pause, or the like.

The application can be signaled through an XAIT transferred through an MPEG stream. In this case, the XAIT includes necessary information for creating contents of application data for the respective applications. For example, when receiving a new XAIT, the multi-screen providing device 700 can renew the application database using information signaled for the application associated to a service selected by a user.

In this case, the multi-screen providing device 700 varies the operations depending on the types of service, as follows:

a) when the application database does not have corresponding application in the application database, the multi-screen providing device 700 creates application information including information signaled by the XAIT;

b) even when the application data base has the corresponding application by the previous signaling, the signaling is no longer performed, the multi-screen providing device deletes the application from the application database;

c) when an application having the same version as in the application database is signaled, the multi-screen providing device 700 renew the application database on the basis of signaled application information;

d) when the application database includes an application, and a new application that is not related to active application instance is signaled, the multi-screen providing device 700 renews the application database on the basis of currently signaled application information; and e) when the application database includes an application, and a new application that is related to active application instance is signaled, the multi-screen providing device 700 completes a signaling process for the previous application or creates application instance that permits only an application that is being executed.

Figure 7:
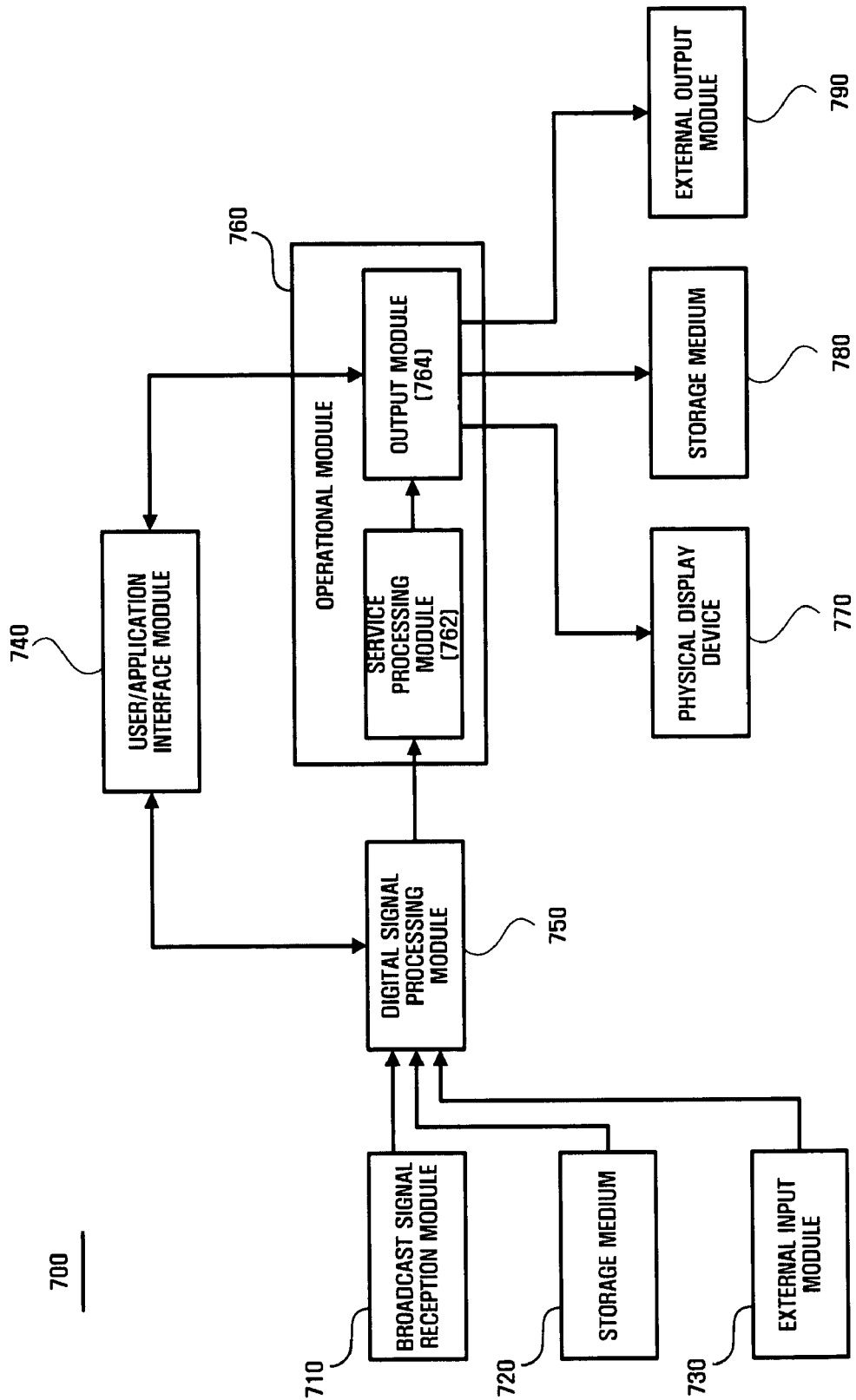
FIG. 7 is a block diagram illustrating a configuration of an apparatus for providing multiple screens according to an exemplary embodiment of the present invention.

FIG. 7 is a block diagram of an apparatus for providing multiple screens according to an exemplary embodiment of the present invention.

Referring to FIG. 7, an apparatus 700 for providing multiple screens includes a digital signal processing module 750, a service processing module 762, an output module 764, and a user/application interface module 740.

Also, the apparatus 700 includes a broadcast signal reception module 710, a storage medium 720, and an external input module 730 as service sources, and includes a physical display device 770, a storage medium 780, and an external output module 790 as service output media.

The term 'module', as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The digital signal processing module 750 receives various information of a service such as a multimedia content, e.g., video information, audio information, or data information, from the broadcast signal reception module 710, the storage medium 720, or the external input module 730.

The broadcast signal reception module 710 receives a satellite, terrestrial, or cable broadcast signal and transmits the received broadcast signal, the storage medium 720 stores video information, audio information, or data information of a service, and the external input module 730 receives video information, audio information, or data information of a service from an external device such as a network interface module connected to a network.

The digital signal processing module 750 restores a plurality of services using received service components. The restored services include abstract or non-abstract services.

Here, the phrase 'a plurality of services' refers to two or more services transmitted by the broadcast signal reception module 710 or two or more services respectively transmitted by the broadcast signal reception module 710 and the storage medium 720.

The digital signal processing module 750 may restore services according to selection by a user or an application with the aid of the user/application interface module 740. In this case, the user or the application may select the connection between an arbitrary service and a screen.

Further, the digital signal processing module 750 confirms whether the application included in data information can be executed on a screen with respect to the received data information. In this case, the digital signal processing module 750 confirms a predetermined flag of the signal included in the data information and then confirms whether the execution is supported. The result is transmitted to an operational module 760 and the user/application interface module 740.

For example, when the flag is 1, a first control signal indicating that the execution on the screen is supported is transmitted. Otherwise, when the flag is 0, a second control signal indicating that the execution of the screen is not supported is transmitted.

The operational module 760 to which control signals have been transmitted varies the operations on the basis of the type of the control signal. When the first control signal is transmitted thereto, the operational module 760 operates the application on the screen. When the second control signal is transmitted thereto, the operational module 760 does not operate the application on the screen. In this case, the screen includes a PiP screen and a Picture-on-Picture (PoP) screen.

The operational module 760 may map the logical screen to the display screen after operating the application on the logical screen, or directly operate the application on the display screen. For this purpose, the operational module 760 may include a service processing module 762 and an output module 764.

The service processing module 762 produces a logical screen and a display screen to display a service restored by the digital signal processing module 750. In this case, the logical screen may be a screen that is allocated for an application performed on a screen by being supported by signaling.

The output module 764 maps a plurality of logical screens produced by the service processing module 762 to the display screen. The mapping of the logical screens to the display screen may be conducted using a predefined method or a method set by the user with the aid of the user/application interface module 762. In detail, the user can perform of mapping for an application that supports multiple screens, in addition to video or audio.

A service restored by the digital signal processing module 750 may not be connected to a logical screen produced by the service processing module 762, but directly connected to a display screen to be output by the output module 764.

A display screen provided by the output module 764 may be displayed on the physical display device 970 or may be stored in the storage medium 780. Examples of the storage medium 780 include computer readable floppy discs, hard discs, CD-ROM. DVD, DVD-ROM, BD (Blu-ray Disc), and semiconductor memories.

Also, a display screen provided by the output module 764 may be transmitted to an external device connected to a network via the external output module 790.

For this, the output module 764 may include a plurality of output ports via which a display screen can be provided. In this case, a display screen can be provided via an output port set in advance as a default or an output port chosen by the user with the aid of the user/application interface module 740.

The user or the application can choose one of a plurality of services or restore desired services using the user/application interface module 740. Also, the user can choose one of a plurality of display screens using the user/application interface module 740.

Since the modules illustrated in FIG. 7 are divided according to their functions, it is possible to be connected to the other modules.

Figure 8:
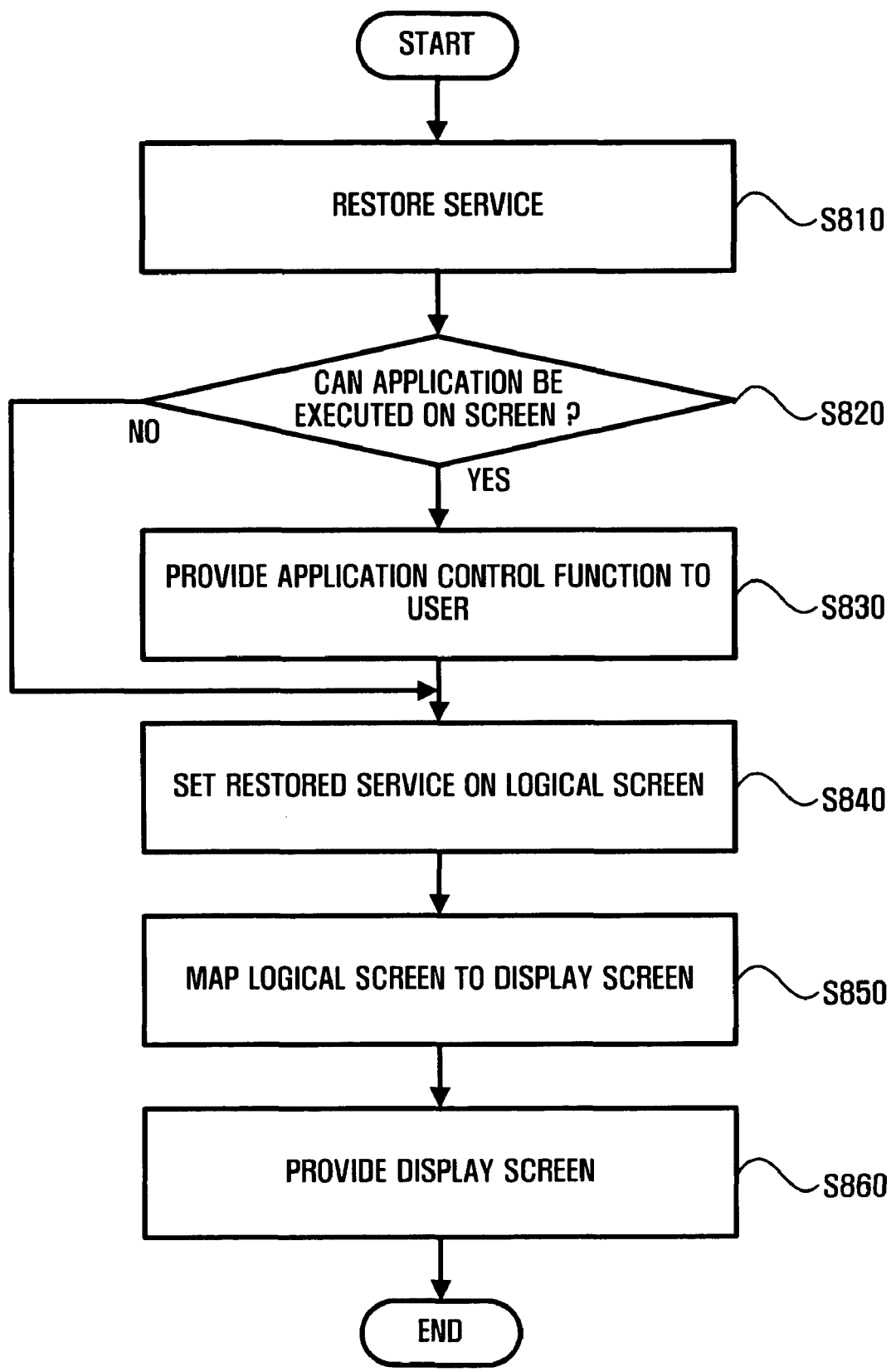
FIG. 8 is a flowchart illustrating a method of dynamically configuring multiple screens according to an exemplary embodiment of the present invention.

FIG. 8 is a flowchart illustrating a method of dynamically configuring multiple screens according to an exemplary embodiment of the present invention.

In general, video information, audio information, and data information constituting a multimedia content are transmitted in a predetermined format, for example, an MPEG stream format. In operation S810, an apparatus for providing a service such as a multimedia content service receives video information, audio information, and data information and restores a service based on the video information, the audio information, and the data information. Here, the service restored in operation S810 may be selected or previously determined by a user or an application. The user may use a menu displayed on the display device 770 or a remote controller to select the connections between an arbitrary screen and a screen. The application may select the connections using an API.

In operation S820, the multi-screen providing device 700 determines whether the application included in the data information can be executed on the screen on the basis of the received data information while receiving the multimedia contents.

The determination result is output through the user/application interface module 740. In operation 830, when a signal included in the data information includes a flag that the multiple screens are supported, the user/application interface module 740 can provide a control function for the application (for example, allocation of the logical screen and control of the screen size) to a user.

Further, the multi-screen providing device 700 manages the lifecycle of the application using a signal 650 that is continuously received. When the signal is not received, the multi-screen providing device 700 completes the application.

In operation S840, the multi-screen providing device 700 sets the restored service to be displayed on the logical screen according to the exemplary embodiment after confirming the signaling. Further, in operation S850, the logical screen is mapped to a display screen according to the exemplary embodiment. In this case, the user can allocate the supplied application to a logical screen and input the size and position of the screen. Therefore, the multi-screen providing device 700 can map the logical screen to the display screen according to the input content by the user.

The restored service is illustrated in FIG. 8 as being displayed on a physical display device via a logical screen. However, the restored service may be directly displayed on a physical display device without passing through the logical screen.

When the user selects the PiP service, the PiP service is realized in two modes. In the first mode, only video component for PiP service selected on the main screen is provided without creating a separate logical screen for PiP service, that is, PiP screen. In the second mode, a separate logical screen for PiP service is created to provide the PiP service selected on the created PiP screen.

FIG. 8 illustrates a method of mapping only one service to a display screen for simplicity. However, a plurality of services may be mapped to a display screen with or without passing through a plurality of logical screens.

When a physical display device 770 is provided to the user in this manner, the user can perform a plurality of services.

According to the apparatus for providing multiple screens and a method of dynamically configuring the multiple screens of exemplary embodiments of the present invention, a user can control a screen that is allocated to a content including an application by providing a packet including predetermined information in order to dynamically configure multiple screens that provides a plurality of contents on a physical display device.

While the present invention has been particularly illustrated and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A method of supporting a plurality of screen configurations on a multi-screen providing device, the method comprising:
   receiving via a broadcast transmission an application and a signal indicating whether the application supports a plurality of logical screens on the multi-screen providing device;
   allocating the plurality of logical screens on a display screen of the multi-screen providing device; and
   renewing an application database of the multi-screen providing device using information included in the signal for the application associated with a service selected by a user,
   wherein it is determined whether the application included in the broadcast transmission can be executed on a screen by checking the signal included in the received broadcast transmission which indicates whether multiple screens are supported while providing an application to the screen.

2. The method of claim 1, wherein the application comprises one of an application by a host device manufacturer, an application that is signaled through an extended application information table, and an application registered through a monitor application.

3. The method of claim 1, wherein the allocating the plurality of logical screens comprises providing a plurality of functions for the logical screens, and the plurality of functions comprise a size and a position of each logical screen on the display screen.

4. A method of supporting a plurality of screen configurations on a multi-screen providing device, the method comprising:
- receiving an application and a signal indicating whether the application supports a plurality of logical screens on the multi-screen providing device;
- allocating the plurality of logical screens on a display screen of the multi-screen providing device; and
- renewing an application database of the multi-screen providing device using information included in the signal for the application associated with a service selected by a user
- wherein the renewing the application database comprises, depending on the associated service, at least one of:
- if the application database of the multi-screen providing device does not have information for the received application, the multi-screen providing device creating application information including information signaled by an extended application information table;
- even if the application database has information for the received application by a previous signaling, and the signaling is no longer performed, the multi-screen providing device deleting the application from the application database;
- if the received application having a same version as in the application database is signaled, the multi-screen providing device renewing the application database based on signaled application information;
- if the application database includes information about the received application, and a new application that is not related to an active application instance is signaled, the multi-screen providing device renewing the application database based on currently signaled application information; and
- if the application database includes an application, and a new application that is related to an active application instance is signaled, the multi-screen providing device completing a signaling process for a previous application or creating an application instance that permits only an application that is being executed.

\* \* \* \* \*